UNITED STATES PATENT OFFICE.

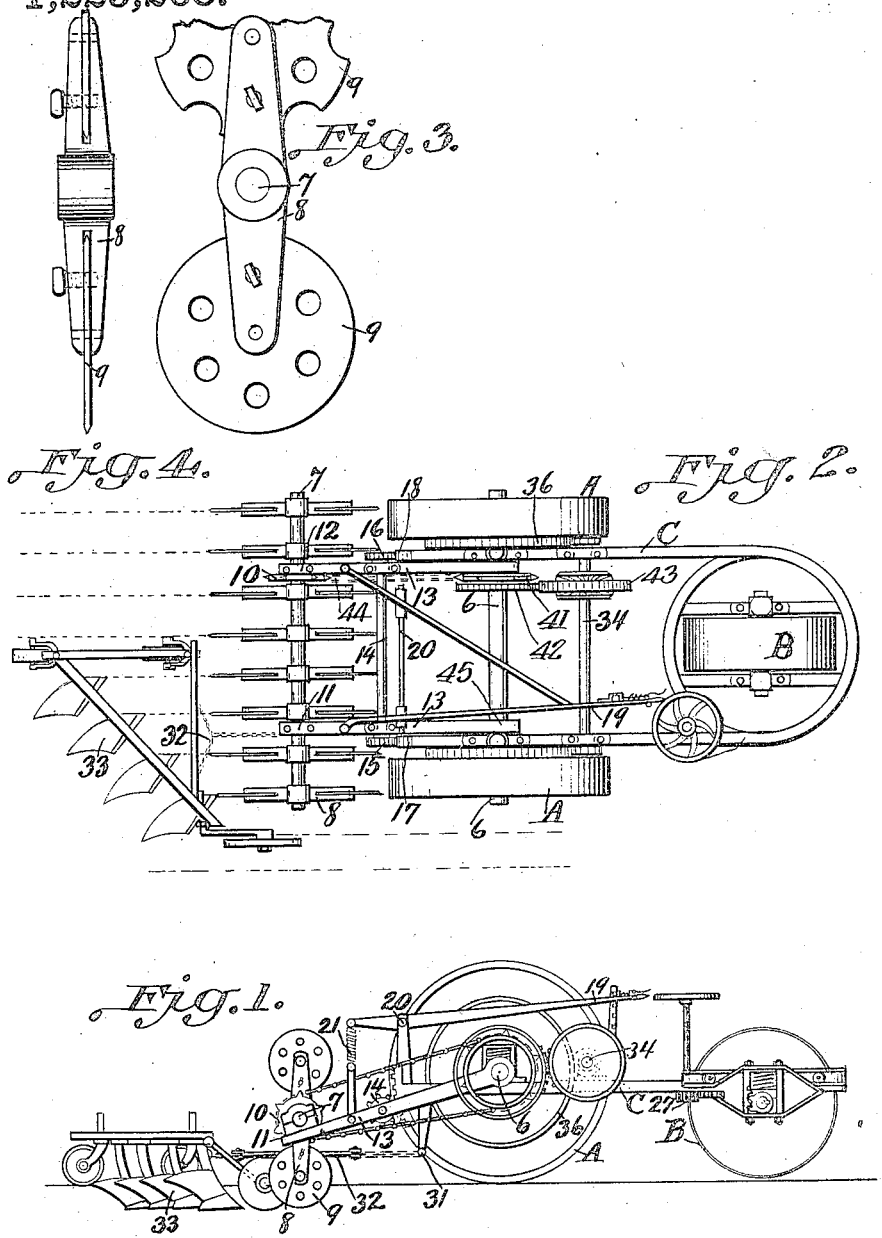

WILLIAM PATERSON, OF OAKLAND, CALIFORNIA.

MOTOR-PLOW TRACTOR.

1,225,268.     Specification of Letters Patent.     Patented May 8, 1917.

Application filed March 13, 1916. Serial No. 82,993.

*To all whom it may concern:*

Be it known that I, WILLIAM PATERSON, a citizen of the United States, residing at Oakland, in the county of Alameda and State of California, have invented a new and useful Motor-Plow Tractor.

My invention relates to improvements in motor plow tractors.

It consists of a plurality of disk colters pivoted at ends of radially disposed spokes or arms mounted equidistant upon a motor power driven revoluble shaft. Said shaft is journaled upon the rear ends of a pair of rearwardly extending arms. The forward ends of said arms are pivotally attached by sleeve around the rear driving axle of a self propelled motor truck. Means for raising and lowering said arms are provided. A trailing gang of plows are hitched to rear end of said motor truck. Said plows are an adjunct to the disk colters, and the plows are mounted so that each plow point follows directly in the cuts made by the disk colters, one plow for each disk cut. Said motor power driven revoluble shaft having the disk colters mounted thereon may be revolved by a sprocket chain deriving rotary motion from the drive wheels of an ordinary motor truck; but I prefer the construction of parts, as hereinafter more fully described and claimed, having reference to the accompanying drawings, in which—

Figure 1 is a side elevation of my device.

Fig. 2 is a plan view of the same.

Fig. 3 is an enlarged end view of a set of arms with disk colters pivoted thereon.

Fig. 4 is an enlarged rear view of the same.

The objects of my invention are to obtain additional traction, coöperating with the main drive wheels of a motor truck, by the action of the disk colters alternately entering into the ground, said power driven disks form a tractor and plow colter combined, forcing the truck forward in the same direction but at a relatively higher rate of speed than that of the main drive wheels of said motor truck; at the same time the colters cut the furrow slices to any desired depth in front of each plow point reduces the resistance of the plow, besides assuring ample traction at all times; and a further object is to bring a percentage of the weight of the motor truck to bear upon the disk colters, and hence upon the subsoil rather than upon the surface.

In the drawing, A A represents motor truck drive wheels, B a steering wheel, C the chassis. The power driven revoluble shaft 7 having the radial spokes or arms 8, disks 9 and sprocket wheel 10 keyed thereon, is journaled at 11 and 12 upon the outer ends of rearwardly extending arms 13. The inner ends of said arms 13 are pivotally connected by sleeve 45 encircling axle 6. No motor is shown in the drawing. The motor power driven revoluble shaft derives its rotary motion from any usual source of power used in propelling auto trucks. Means for raising and lowering the rearwardly extending arms 13 may be of any suitably constructed lever mechanism; that shown in the drawing preferred but not claimed in this application. A draft rod 32, attached by a clevis having lateral adjustment to the chassis or running gear of the truck at 31, extends and is hitched to a gang of trailing plows 33; said plows being an adjunct to the disk colters; the point of each plow is adjusted to follow directly in the cut made by the disk colters.

Having thus described my invention, what I claim and desire to secure by Letters Patent is—

In a power driven plow in combination, a motor truck supported near its rear end on a driving axle, a pair of rearwardly extending arms having their forward ends pivotally attached by sleeve encircling said axle, a horizontal power driven revoluble shaft journaled upon the rear ends of said arms, radial arms secured to said shaft, disks pivotally mounted on the outer ends of said last named arms, a trailing gang of plows secured to said motor truck, the plows being so mounted that the point of each plow will travel in rear of and in alinement with its corresponding disk, as shown and described and for the purposes set forth in the foregoing specification.

WILLIAM PATERSON.

Witnesses:
G. S. NAISMITH,
JAS. S. NAISMITH.